(12) United States Patent
Yoshihara et al.

(10) Patent No.: US 6,876,424 B1
(45) Date of Patent: Apr. 5, 2005

(54) LIQUID CRYSTAL DISPLAY HAVING A SPONTANEOUS POLARIZATION

(75) Inventors: Toshiaki Yoshihara, Kawasaki (JP); Tetsuya Makino, Kawasaki (JP); Hironori Shiroto, Kawasaki (JP); Yoshinori Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 09/657,386

(22) Filed: Sep. 8, 2000

(30) Foreign Application Priority Data

Nov. 5, 1999 (JP) .......................................... 11-316008

(51) Int. Cl.$^7$ .............................................. C09K 19/02
(52) U.S. Cl. ...................................................... 349/172
(58) Field of Search ........................ 349/61, 167, 172, 349/38, 143, 144, 96, 117

(56) References Cited

U.S. PATENT DOCUMENTS 5,465,168 A * 11/1995 Koden et al. .................. 345/96
5,541,747 A * 7/1996 Nishi et al. ..................... 349/49
5,642,214 A * 6/1997 Ishii et al. ...................... 349/96
6,177,968 B1 * 1/2001 Okada et al. ................. 349/143

FOREIGN PATENT DOCUMENTS

JP                534724              2/1993

* cited by examiner

Primary Examiner—Tarifur R. Chowdhury
Assistant Examiner—P. R. Akkapeddi
(74) Attorney, Agent, or Firm—Greer, Burns & Crain, Ltd.

(57) ABSTRACT

A liquid crystal display in which a liquid crystal, which has a spontaneous polarization of a magnitude of not more than ½ of a maximum quantity of charge that is injected to each pixel when the switching element is turned on, is filled between alignment films formed on respective glass substrates, so as to form a liquid crystal layer thereby to drive the liquid crystal by using a lower applied voltage.

13 Claims, 11 Drawing Sheets

TIME

EXAMPLE 1

EXAMPLE 2

EXAMPLE 4

☐ : R (RED)
☒ : G (GREEN)
◩ : B (BLUE)

LIQUID CRYSTAL DISPLAY HAVING A SPONTANEOUS POLARIZATION

BACKGROUND OF THE INVENTION

The present invention relates to a liquid crystal display, and more particularly to a liquid crystal display using a liquid crystal having a spontaneous polarization.

Along with the recent developments of the so-called office automation (OA), OA apparatuses, typically exemplified by word-processors and personal computers, have been widely used. As such OA apparatuses have become prevalent in offices, there have been ever-increasing demands for portable-type OA apparatuses that can be used in offices as well as outdoors; and there have been also demands for small-size and light-weight of such apparatuses. Here, liquid crystal displays have come to be widely used as one of the means to achieve such an objective. Liquid crystal displays not only achieve small-size and light-weight, but also include an indispensable technique in an attempt to achieve low power consumption in portable OA apparatuses that are driven by batteries.

The liquid crystal displays are mainly classified into the reflection-type and the transmission-type. In the reflection-type liquid crystal displays, light rays that have been made incident on the front face of a liquid crystal panel are reflected by the back face of the liquid crystal panel so that an image is visualized by the reflected light. In the transmission-type liquid crystal displays, transmitted light from a light source (back-light) placed behind the back face of a liquid crystal panel is used to visualize an image. Although those of the reflection-type are inferior in visibility due to irregularity in the amount of reflected light that depends on environment conditions, they are inexpensive and widely used as display devices with mono-color (for example, black/white display, etc.) for such as calculators and watches. However, they are not suitable for display devices for personal computers, etc. which carry out a multi-color or full-color display. For this reason, in general, transmission-type liquid crystal displays are used as display devices for personal computers, etc. which carry out a multi-color or full-color display.

Here, currently-used color liquid crystal displays are generally classified into the STN (Super Twisted Nematic) type and the TFT-TN (Thin Film Transistor-Twisted Nematic) type based upon the liquid crystal type to be used. Although those of the STN type have comparatively low manufacturing costs, they are susceptible to cross-talk, and comparatively slow in response speeds; therefore, they are not suitable for display for animation pictures. In contrast, those of the TFT-TN type have higher display quality as compared with the STN type; however, since, at present, their liquid crystal panel has a light transmittance as low as 4%, a back-light with high luminance is required. For this reason, those of the TFT-TN type have greater power consumption due to the back-light, resulting in a problem in use of carrying battery power-source. Moreover, the TFT-TN type have other problems with the response speed, particularly slow in response speed for displaying half tones, narrow viewing angle, difficulty in adjusting the color balance, etc.

In order to solve the above-mentioned problems, a new type of liquid crystal devices have been developed in which a liquid crystal (ferroelectric liquid crystal or anti-ferroelectric liquid crystal, etc.) having a spontaneous polarization, which has a high response speed of hundreds to several $\mu$ seconds order to an applied electric field, is used and this liquid crystal is driven by using a switching element such as a TFT. In the case when such a ferroelectric liquid crystal or an anti-ferroelectric liquid crystal is used, the liquid crystal molecules are constantly maintained in parallel with the substrate (glass substrate) independent of the presence or absence of an applied voltage so that it is possible to achieve a very wide viewing angle.

However, in the liquid crystal display using a liquid crystal having a spontaneous polarization, such as a ferroelectric liquid crystal or an anti-ferroelectric liquid crystal, that is driven by using a switching element, there is a problem in which the driving operation requires a greater voltage.

FIG. 1 is a graph that shows the relationship between the applied voltage and the light transmittance in a conventional liquid crystal display using a ferroelectric liquid crystal. FIG. 1 shows that an applied voltage of ±15 V is required to adjust the light transmittance of the liquid crystal; however, from the viewpoint of voltage resistance, etc., of the liquid crystal driving driver IC, etc., it is preferable to set the applied voltage to not more than ±10 V.

BRIEF SUMMARY OF THE INVENTION

The present invention has been devised to solve the above-mentioned problems, and its objective is to provide a liquid crystal display which adjusts the magnitude of a spontaneous polarization and the relative dielectric constant of a liquid crystal to appropriate values so that it can drive the liquid crystal even by using a low applied voltage.

The inventors, etc. of the present invention have carried out various experiments as described below so as to develop a liquid crystal display which can drive a liquid crystal by using even a low applied voltage.

First, as shown in Table 1, a plurality of liquid crystals whose spontaneous polarization had a magnitude in the range of 2.5 to 27 nC/cm$^2$ and whose relative dielectric constant was set in the range of 3 to 8 were prepared. Here, the magnitude of the spontaneous polarization refers to a ½ of a quantity of charge that flows when the spontaneous polarization is inverted.

After glass substrates having transparent electrodes with an electrode area of 1.77 cm$^2$ had been washed, polyimide was applied to these by a printing method, and these were baked for one hour at 200° C. to form polyimide films as alignment films each having a thickness of approximately 200 Å.

Moreover, these alignment films were rubbed with a cloth made of rayon, and lapped with a gap between them maintained by spacers made of silica having an average particle size of 1.6 $\mu$m; thus, an empty panel was formed. A ferroelectric liquid crystal as shown in Table 1 was sealed between the alignment films of this empty panel to form a liquid crystal display element.

Then, to the liquid crystal display element thus formed is connected an FET (Field-Effect transistor) serving as a switching element, and a voltage is applied to the liquid crystal display element through this FET switching element; thus, the driving voltage and the holding rate were measured. FIG. 2 is an explanatory drawing that explains the definition of the driving voltage and that indicates the relationship between the light transmittance and the applied voltage of the liquid crystal. As shown in FIG. 2, the driving voltage represents an applied voltage that is required to allow the light transmittance of the liquid crystal to reach 100%. Moreover, the holding rate is a value obtained as follows:

FIG. 3 is an explanatory drawing that explains the definition of the holding rate, FIG. 3A shows changes in the applied voltage at the times of ON/OFF of the FET, and FIG. 3B shows changes in the voltage inside the liquid crystal display element at the times of ON/OFF of the FET.

In order to obtain the holding rate, the voltage inside the liquid crystal display element is measured during a period from the turning on of the FET to the next turning on of the FET. As shown in FIG. 3B, since a voltage is being applied during the time in which the FET is turned on, the voltage inside the liquid crystal display is maintained in a high level; however, when the FET is turned off, the voltage drops in the liquid crystal display element.

In FIG. 3B, an area a represents an integral value of the voltage inside the liquid crystal display element during a period from the turning on of the FET to the next turning on of the FET. Moreover, an area a+b represents an integral value of the voltage inside the liquid crystal display element in the case when the applied voltage has been maintained during a period from the turning on of the FET to the next turning on of the FET. Thus, the area ratio of the area a to the area a+b is defined as the holding rate.

Here, in this experiments, the time in which the FET is maintained ON is 5 μs, and the cycle thereof is set to be 2.8 ms.

FIG. 4 is a graph that shows the relationship between the holding rate and (Q−2Ps)/Q per unit area at the time of applying a driving voltage. Here, Q represents a quantity of charge that is injected to the liquid crystal display element at the time of applying the driving voltage. As shown in FIG. 4 there is a strong correlation between the holding rate and (Q−2Ps)/Q at the time of applying a driving voltage, and these values are virtually coincident with each other. It is considered that this phenomenon is due to the influence of an inversion of a spontaneous polarization.

In other words, the quantity of charge, which has been injected to the liquid crystal display element while the FET is maintained ON, is consumed by the inversion of the spontaneous polarization to a quantity corresponding to 2Ps while the FET is maintained OFF; therefore, it is considered that the holding rate and (Q−2Ps)/Q are virtually coincident with each other.

Based upon the above-mentioned phenomenon, supposing the holding rate=(Q−2Ps)/Q, Ps≦Q/2 is obtained since the holding rate is not less than 0. Thus, the inventors, etc. of the present invention have found that, when the magnitude of the spontaneous polarization of a liquid crystal is not more than ½ of the maximum quantity of charge that is to be injected to a liquid crystal display element (hereinafter, referred to as a pixel) corresponding to each pixel while the switching element is maintained ON, it is possible to drive the liquid crystal display by utilizing the quantity of charge accumulated in the pixel. Based upon this finding, they have invented a liquid crystal display described below.

A liquid crystal display in accordance with the present invention, which has a liquid crystal having a spontaneous polarization, held between a pair of opposing substrates, with an electrode and a switching element corresponding to a pixel being placed on an inner surface of one of the substrates, is characterized in that the magnitude of the spontaneous polarization of the liquid crystal is not more than ½ of a maximum quantity of charge that is injected to each pixel when the switching element is turned on.

In this case, a liquid crystal having a spontaneous polarization, such as a ferroelectric liquid crystal and an anti-ferroelectric liquid crystal, is sealed between the pair of opposing substrates. Further, the magnitude of the spontaneous polarization of the liquid crystal sealed therein is more than ½ of a maximum quantity of charge that is to be injected to each pixel when the switching element is in an on-state. Therefore, as compared with conventional liquid crystal displays, the present liquid crystal display makes it possible to drive the liquid crystal with a lower applied voltage.

Moreover, a liquid crystal display in accordance with the present invention is characterized in that the magnitude of the spontaneous polarization of the liquid crystal is not more than 15 nC/cm².

Furthermore, another liquid crystal display in accordance with the present invention is characterized in that the magnitude of the spontaneous polarization of the liquid crystal is not more than 10 nC/cm².

Still another liquid crystal display in accordance with the present invention is characterized in that the magnitude of the spontaneous polarization of the liquid crystal is not more than 7 nC/cm².

Moreover, still another liquid crystal display in accordance with the present invention is characterized in that the relative dielectric constant of the liquid crystal is not less than 3.

In liquid crystal displays, in general, from the viewpoint of voltage resistance of a liquid crystal driver IC, etc., it is required that the applied voltage is not more than ±10 V. Moreover, at present, the output voltages of generally-used liquid crystal driver ICs are ±10 V, ±7 and ±5 V.

Supposing the applied voltage is ±10 V, and that charge of approximately 3 nC is injected to the pixel electrodes per a square centimeter, the quantity of charge to be injected to each pixel is approximately 30 nC/cm². Here, as described earlier, the magnitude of the spontaneous polarization is ½ the quantity of charge that flows at the time of inversion of the spontaneous polarization. Therefore, in the case when the magnitude of the spontaneous polarization of the liquid crystal is not more than 15 nC cm², that is ½ of the value 30 nC/cm², it becomes possible to drive the liquid crystal by using a liquid crystal driver IC having an output voltage of ±10 V.

Moreover, supposing the applied voltage is ±7, the quantity of charge to be injected to each pixel is approximately 20 nC/cm². Therefore, in the same manner as described above, in the case when the magnitude of the spontaneous polarization of the liquid crystal is not more than 10 nC cm², that is ½ of the value 20 nC/cm², it becomes possible to drive the liquid crystal by using a liquid crystal driver IC having an output voltage of ±7 V.

Furthermore, supposing the applied voltage is ±5, the quantity of charge to be injected to each pixel is approximately 15 nC/cm². Therefore, in the same manner as described above, in the case when the magnitude of the spontaneous polarization of the liquid crystal is not more than 7 nC cm², that is ½ of the value 15 nC/cm², it becomes possible to drive the liquid crystal by using a liquid crystal driver IC having an output voltage of ±5 V.

As described above, the quantity of charge injected to each pixel is mainly determined by a driving voltage; however, the quantity of charge varies depending on the relative dielectric constant of the liquid crystal. When the relative dielectric constant is not less than 3, the quantity of charge as described above can be injected to each pixel.

Here, the liquid crystal can be driven as long as the inversion in the spontaneous polarization occurs; therefore, the spontaneous polarization may be any magnitude greater than 0 nC/cm².

Moreover, a liquid crystal display in accordance with the present invention is further provided with a back-light for emitting white light and color filters of three primary colors placed between the above-mentioned substrates, and characterized in that the emitted light is selectively transmitted through the color filters of the three primary colors so as to carry out a color display.

In this case, the back-light is allowed to emit white light, and this light is selectively transmitted through the color filters of red, green and blue so as to carry out a color display.

Moreover, another liquid crystal display of the present invention is further provided with a back-light having light sources for respectively emitting light rays of the three primary colors, and characterized in that these light sources are allowed to emit light rays in a time divided manner in synchronism with ON/OFF driving processes of the switching element so that it is possible to carry out a color display.

In this case, the light sources for respectively emitting light rays of the three primary colors are allowed to emit light rays in a time divided manner in synchronism with ON/OFF driving processes of the switching element so that it becomes possible to carry out a color display without using color filters.

The above and further objects and features of the invention will more fully be apparent from the following detailed description with accompanying drawings.

DETAILED DESCRIPTION OF THE INVENTION

Referring to Figures, the following description will discuss one embodiment of the present invention in detail.

Figure 5:
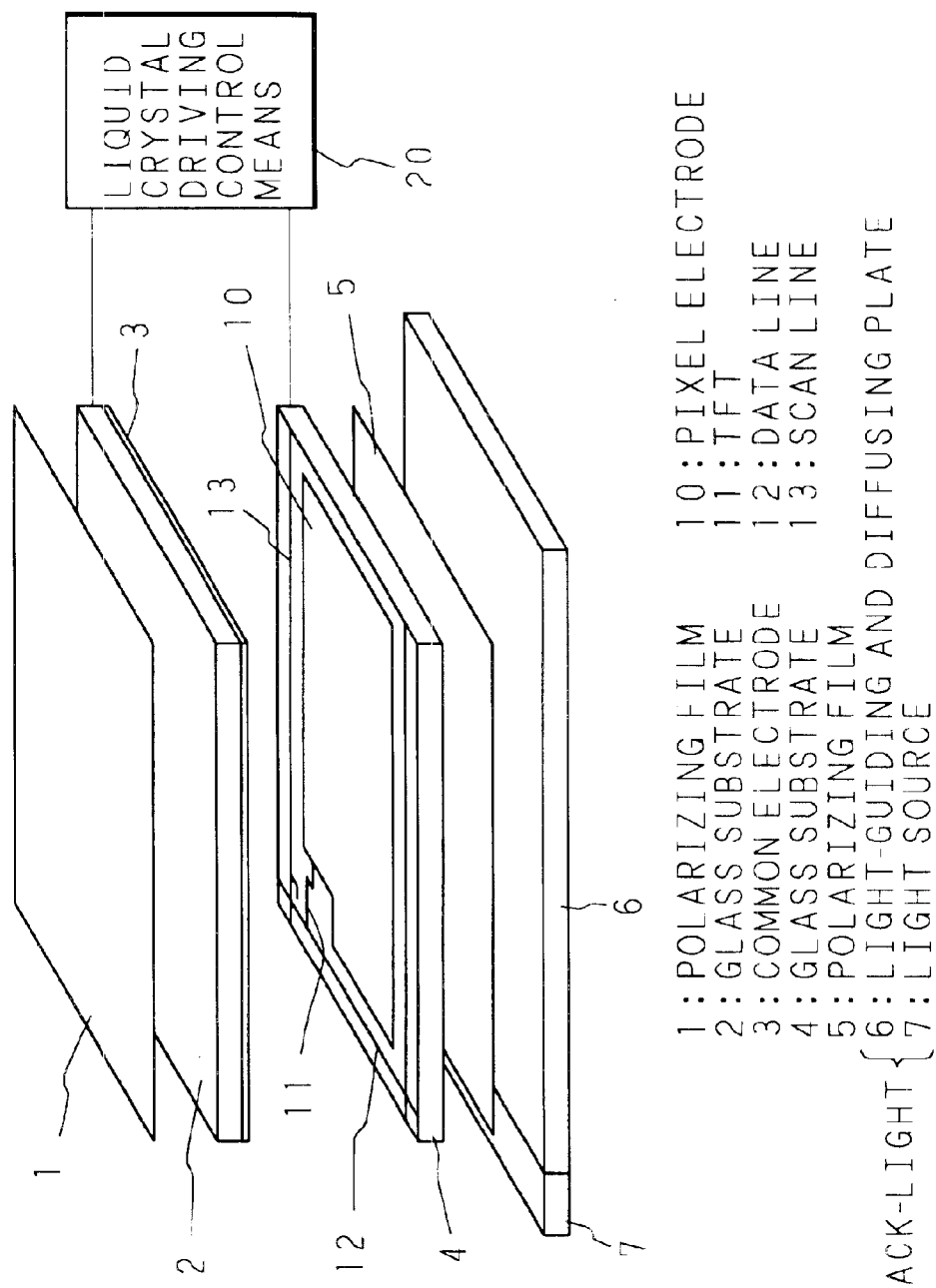
FIG. 5 is a schematic perspective view that shows an example of the entire structure of a liquid crystal display in accordance with the present invention.

FIG. 5 is a schematic perspective view that shows an example of the entire structure of a liquid crystal display in accordance with the present invention. As illustrated in FIG. 5, a liquid crystal panel in the liquid crystal display of the present invention is provided as a structure located between two polarizing films 1 and 5. More specifically, this structure includes a polarizing film 1, a glass substrate 2, a common electrode 3, a glass substrate 4 and a polarizing film 5 that are stacked in this order from the top-layer (surface) side to the bottom-layer (rear face) side.

Moreover, a back-light, constituted by a light source 7 and a light-guiding and diffusing plate 6, is arranged on the bottom-layer side of the liquid crystal panel.

Pixel electrodes 10, arranged in a matrix form, are formed on the surface of the glass substrate 4 on the common electrode 3 side. A liquid crystal driving control means 20 constituted by a data driver, a scan driver, etc. is connected between the common electrode 3 and the pixel electrodes 10. Here, each pixel electrode 10 is on/off controlled by a TFT 11, and each TFT 11 is driven by a data driver and a scan driver that respectively turn on/off data lines 12 and scanning lines 13 selectively. Then, the intensity of transmitted light of each pixel is controlled in accordance with data from the data line 12.

Figure 6:
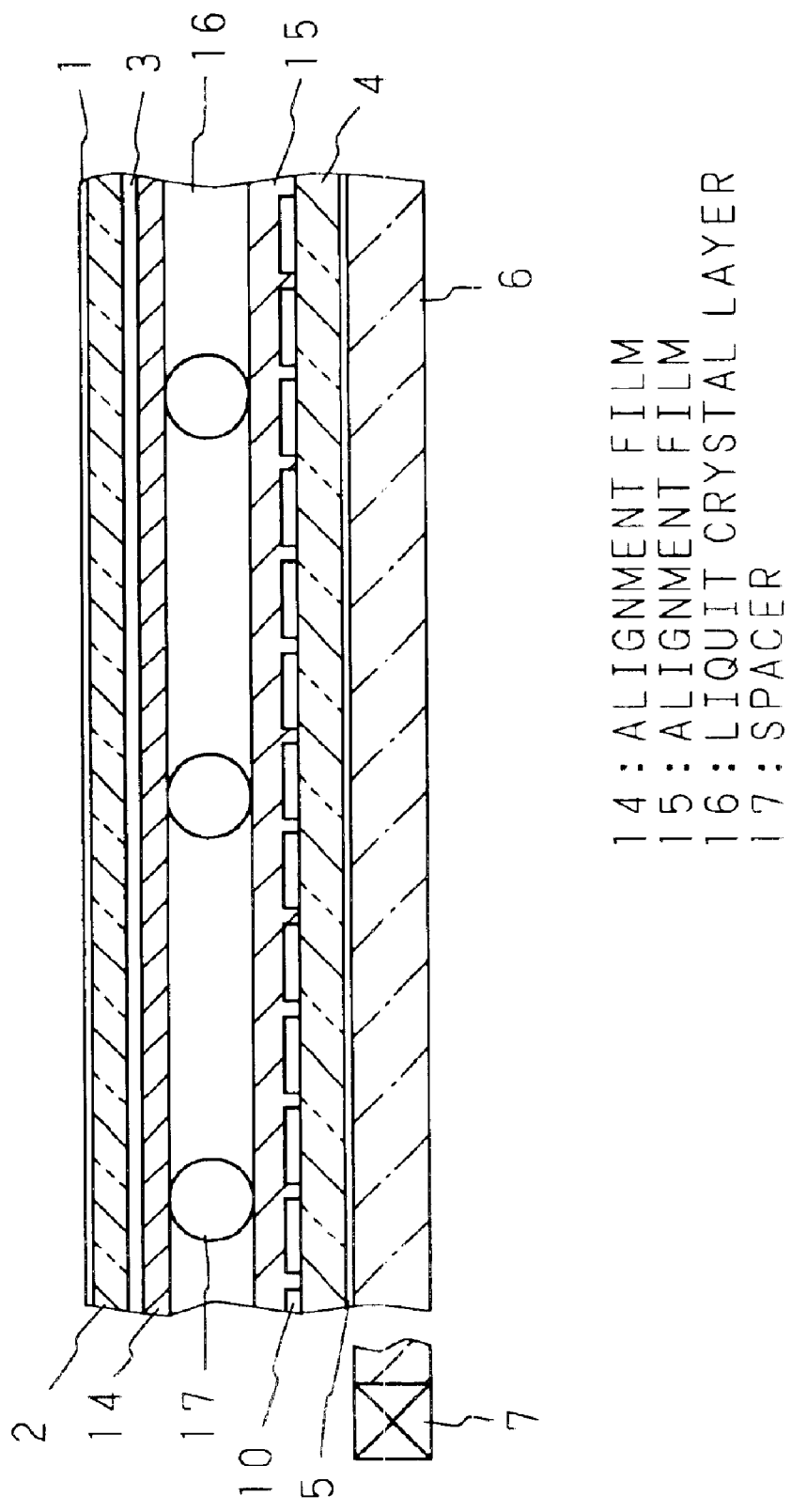
FIG. 6 is a schematic cross-sectional view that shows a liquid crystal panel and a back-light used in the liquid crystal display of the present invention.

FIG. 6 is a schematic cross-sectional view that shows the liquid crystal panel and the back-light.

An alignment film 15 is formed on the upper face of the pixel electrodes 10 on the glass substrate 4, and an alignment film 14 is formed on the lower face of the common electrode 3; thus, a ferroelectric liquid crystal is filled into the void between the alignment films 14 and 15 so that a liquid crystal layer 16 is formed. Here, reference number 17 represents spacers that maintain the layer thickness of the liquid crystal layer 16.

(Embodiment 1)

In the liquid crystal display of Embodiment 1 of the present invention, a back-light of white light is used, and color filters of three primary colors (placed on the glass substrate 2 on the surface side correspondingly to each the pixel electrodes 10) are used so that the white light is selectively transmitted so as to carry out a color display.

First, the liquid crystal panel, shown in FIG. 5, was manufactured as follows: Individual pixel electrodes 10 were arranged with pitches 0.1025 mm×0.3075 mm so as to form a matrix having pixels of 800×3 (RGB)×600 with a diagonal length of 12.1 inches; thus, a TFT substrate was formed. After this TFT substrate and a glass substrate 2 having the color filters and a common electrode 3 had been washed, polyimide was coated to these by using a spin coater, and baked for one hour at 200° C. to form alignment films 14 and 15 made of polyimide films each having a thickness of approximately 200 Å.

Moreover, these alignment films 14 and 15 were rubbed with a cloth made of rayon, and lapped with a gap being maintained between them by spacers 17 made of silica having an average particle size of 1.6 μm; thus, an empty panel was formed. A ferroelectric liquid crystal with naphthalene-series liquid crystal being the main component was sealed between the alignment films 14 and 15 of this empty panel. This naphthalene-series liquid crystal has a spontaneous polarization. The panel thus formed was sandwiched by two polarizing films 1 and 5 (made by Nitto Denko: NPF-EG1225DU) maintained in a cross-nicol state so that a dark state could be formed when the ferroelectric liquid crystal molecules tilted to one side; thus, a liquid crystal panel was formed.

In order to reduce the driving voltage to a low level in the liquid crystal display of the present invention provided with the liquid crystal panel manufactured as described above, it is necessary to adjust the spontaneous polarization of the liquid crystal to an appropriate magnitude. The following description will discuss some examples that can reduce the driving voltage to a low level.

EXAMPLE 1

In Example 1, the ferroelectric liquid crystal sealed in the liquid crystal panel has relative dielectric constant of approximately 6 and a magnitude of the spontaneous polarization of 13.5 $nC/cm^2$.

Figure 7:
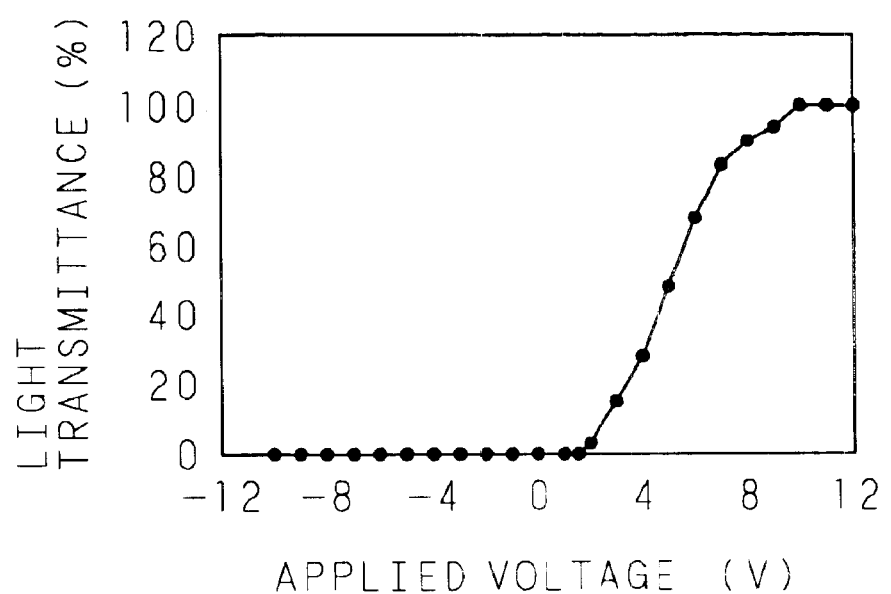
FIG. 7 is a graph that shows the relationship between the applied voltage and the light transmittance in Example 1.

Then, a voltage was applied to the liquid crystal through the switching element of the TFT 11 so that the applied voltage and the light transmittance were measured. Consequently, as shown in FIG. 7, the light transmittance varied in proportion to the applied voltage and came to be saturated at approximately 10 V. Therefore, the liquid crystal display of the present example can be driven by using a liquid crystal driver IC of an output voltage of ±10 V.

Here, in the case when a voltage of 10 V was applied during the ON-state of the switching element, the quantity of charge injected to each pixel was 29 $nC/cm^2$.

Next, an explanation will be given of the displaying operation of the liquid crystal display of the present invention in accordance with Example 1. In the liquid crystal display, writing scanning processes are carried out twice in each of frames. Here, in the first writing scanning (data-writing scanning), a signal having a voltage corresponding to pixel data is supplied to each pixel of the liquid crystal panel from a data driver of a liquid crystal driving control means 20. Thus, the light transmittance was adjusted by the applied voltage so that an image corresponding to the pixel data is displayed.

Then, in the second writing scanning (data-erasing scanning), a signal having a voltage with a reverse polarity to that of the first writing scanning is supplied to each pixel of the liquid crystal panel from the data driver of the liquid crystal driving control means 20. Thus, the voltage with the same intensity as that of the first writing scanning with the reverse polarity is applied to each pixel of the liquid crystal panel so that the display of each pixel of the liquid crystal panel is erased.

Between the first writing scanning (data-writing scanning) and the second writing scanning (data-erasing scanning), voltages of signals supplied to each pixel in the liquid crystal panel have the same magnitude with only different polarities, with the result that it is possible to prevent a DC component from being applied to the liquid crystal.

EXAMPLE 2

In Example 2, the ferroelectric liquid crystal sealed in the liquid crystal panel has a relative dielectric constant of approximately 6 and a magnitude of the spontaneous polarization of 8.2 $nC/cm^2$.

Figure 8:
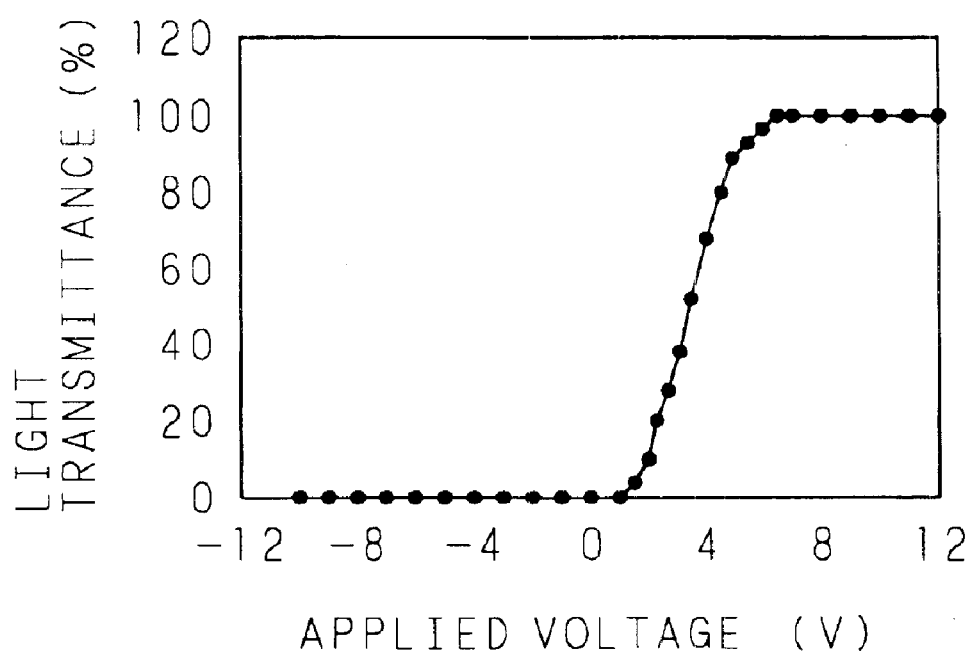
FIG. 8 is a graph that shows the relationship between the applied voltage and the light transmittance in Example 2.

Then, a voltage was applied to the liquid crystal through the switching element of the TFT 11 so that the applied voltage and the light transmittance were measured. Consequently, as shown in FIG. 8, the light transmittance varied in proportion to the applied voltage and came to be saturated at approximately 6.5 V. Therefore, the liquid crystal display of the present example can be driven by using a liquid crystal driver IC of an output voltage of ±7 V.

Here, in the case when a voltage of 6.5 V was applied during the ON-state of the switching element, the quantity of charge injected to each pixel was 19.7 $nC/cm^2$.

EXAMPLE 3

In Example 3, the ferroelectric liquid crystal sealed in the liquid crystal panel has a relative dielectric constant of approximately 5 and a magnitude of the spontaneous polarization of 6.3 $nC/cm^2$.

Figure 9:
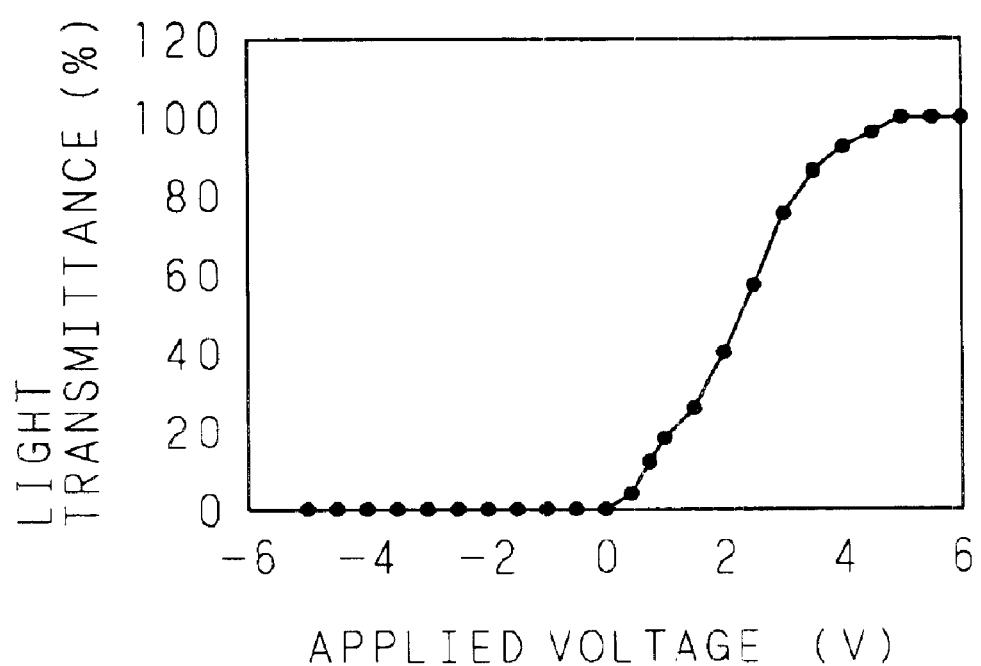
FIG. 9 is a graph that shows the relationship between the applied voltage and the light transmittance in Example 3.

Then, a voltage was applied to the liquid crystal through the switching element of the TFT 11 so that the applied voltage and the light transmittance were measured. Consequently, as shown in FIG. 9, the light transmittance varied in proportion to the applied voltage and came to be saturated at approximately 5 V. Therefore, the liquid crystal display of the present example can be driven by using a liquid crystal driver IC of an output voltage of ±5 V.

Here, in the case when a voltage of 5 V was applied during the ON-state of the switching element, the quantity of charge injected to each pixel was 14 $nC/cm^2$.

EXAMPLE 4

In Example 4, the ferroelectric liquid crystal sealed in the liquid crystal panel has a relative dielectric constant of approximately 3 and a magnitude of the spontaneous polarization of 5.1 $nC/cm^2$.

Figure 10:
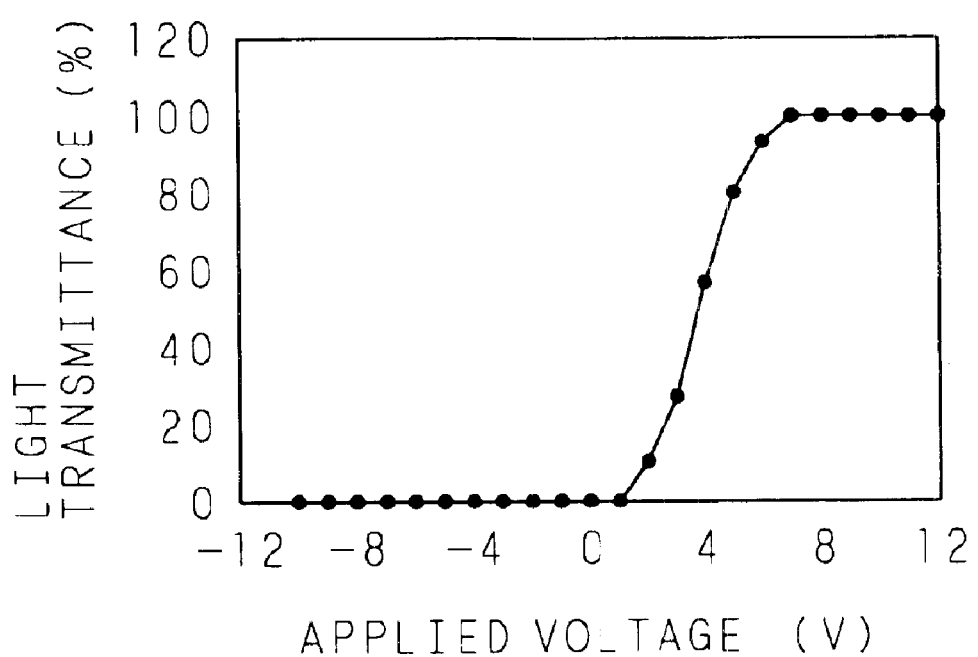
FIG. 10 is a graph that shows the relationship between the applied voltage and the light transmittance in Example 4.

Then, a voltage was applied to the liquid crystal through the switching element of the TFT 11 so that the applied voltage and the light transmittance were measured. Consequently, as shown in FIG. 10, the light transmittance varied in proportion to the applied voltage and came to be saturated at approximately 7 V. Therefore, the liquid crystal display of the present example can be driven by using a liquid crystal driver IC of an output voltage of ±7 V.

Here, in the case when a voltage of 7 V was applied during the ON-state of the switching element, the quantity of charge injected to each pixel was 10.5 $nC/cm^2$.

With respect to the displaying operation of the liquid crystal displays in accordance with Examples 2, 3 and 4 of the present invention, since it is carried out in the same manner as Example 1, the description thereof is omitted.
(Embodiment 2)

In the liquid crystal display of Embodiment 2, different from Embodiment 1, no color filters were used, and a back-light was allowed to emit three-color light rays in a time divided manner so as to carry out a full-color display.

Figure 11:
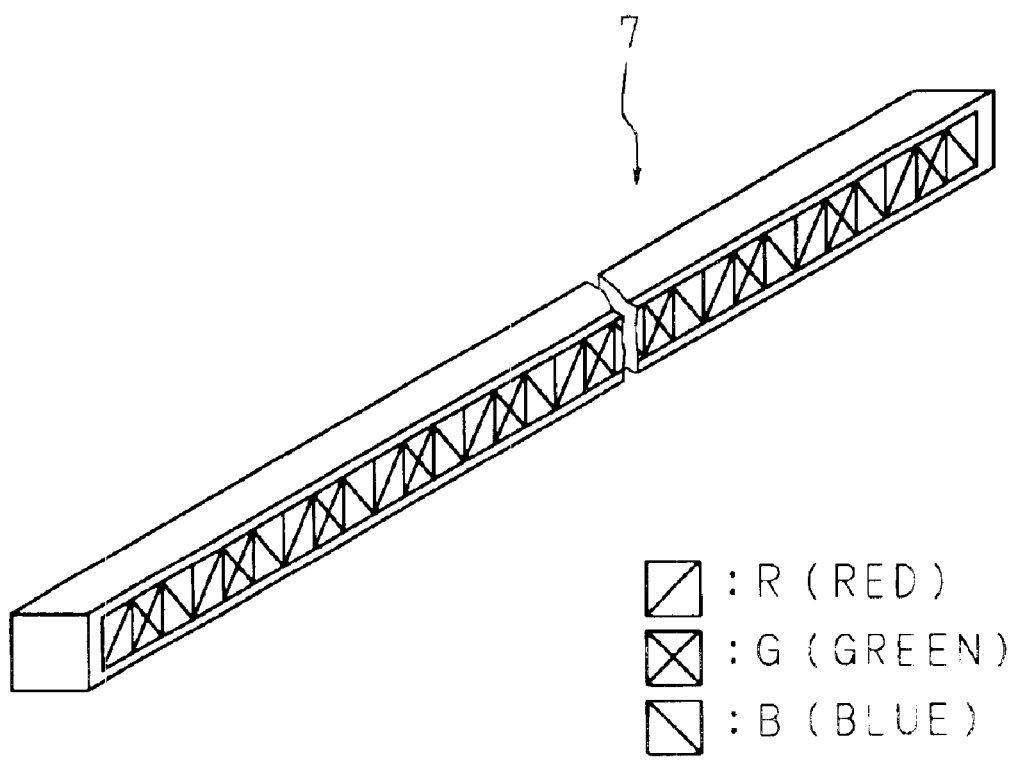
FIG. 11 is a schematic drawing that shows a structural example of a light source (LED array) of Embodiment 2.

As illustrated in a schematic drawing in FIG. 11, a light source 7 in Embodiment 2 is provided as an LED array in which LEDs for emitting three primary colors, that is, red (R), green (G) and blue (B), are arranged in this order in succession on the face opposing to the light-guiding and diffusing plate 6. The light-guiding and diffusing plate 6 guides light rays emitted from the respective LEDs of such a light source 7 to its entire surface and diffuses them toward the upper face; thus, it functions as a light-emitting area.

Then, the LEDs of the back-light are allowed to emit light rays in the order of red, green and blue by specified periods, and in synchronism with this operation the respective pixels in the liquid crystal panel are switched by lines so as to carry out a display. During the emissions of the respective colors, writing scanning operations (first data-writing scanning and second data-erasing scanning) are carried out twice in the same manner as Embodiment 1 so that an image corresponding to pixel data is displayed. Here, a timing is adjusted so that the end timing of the second scanning (data-erasing scanning) for a certain color is coincident with the start timing of the first scanning (data-writing scanning) of the next color.

The liquid crystal panel of the present Embodiment was manufactured as follows: Individual pixel electrodes 10 were arranged with pitches 0.24 mm×0.24 mm so as to form a matrix format having pixels of 1024×768 with a diagonal length of 12.1 inches; thus, a TFT substrate was formed. After this TFT substrate and a glass substrate 2 having a common electrode 3 had been washed, polyimide was coated to these by using a spin coater, and baked for one hour at 200° C. to form alignment films made of polyimide films each having a thickness of approximately 200 Å.

Moreover, these alignment films were rubbed with a cloth made of rayon, and lapped with a gap being maintained between them by spacers made of silica having an average particle size of 1.6 μm; thus, an empty panel was formed. A ferroelectric liquid crystal with naphthalene-series liquid crystal being the main component was sealed between the alignment films and of this empty panel. This naphthalene-series liquid crystal has a spontaneous polarization. The panel thus formed was sandwiched by two polarizing films 1 and 5 maintained in a cross-nicol state so that a dark state could be formed when the ferroelectric liquid crystal molecules tilted to one side; thus, a liquid crystal panel was formed.

In the case of Embodiment 2 also, in the same manner as the respective Examples of Embodiment 1, when a liquid crystal with the magnitude of its spontaneous polarization and relative dielectric constant being adjusted is applied, it becomes possible to drive the liquid crystal by using a low voltage.

COMPARATIVE EXAMPLE

In this Comparative Example, the ferroelectric liquid crystal sealed in the liquid crystal panel was set to have a magnitude of the spontaneous polarization of 21.8 nC/cm² with a rough relative dielectric constant.

Figure 1:
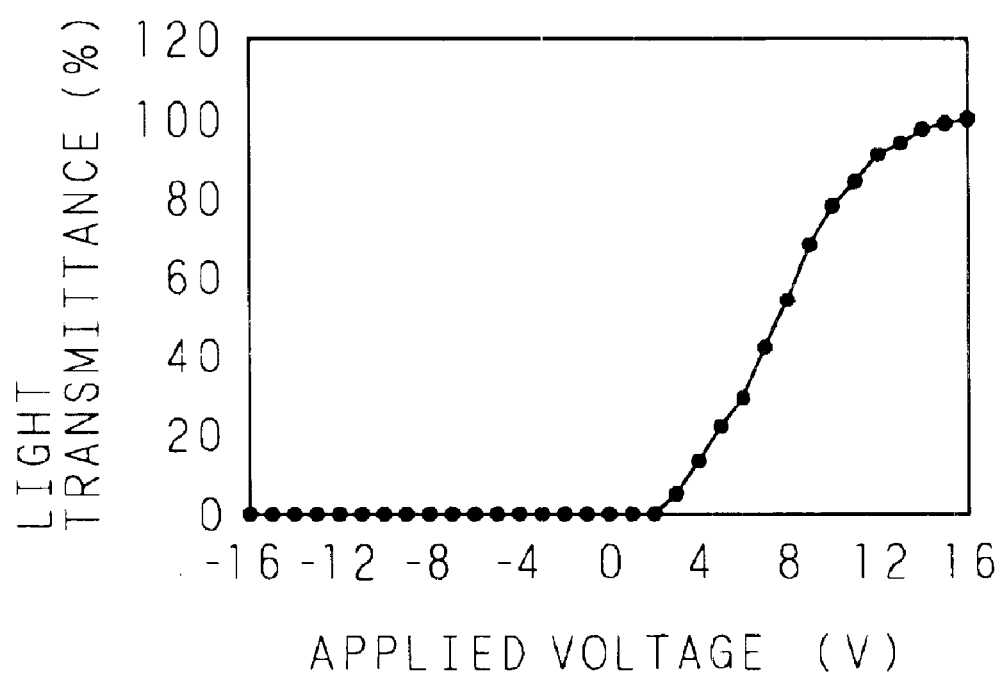
FIG. 1 is a graph that shows the relationship between the applied voltage and the light transmittance in a conventional liquid crystal device.
Figure 2:
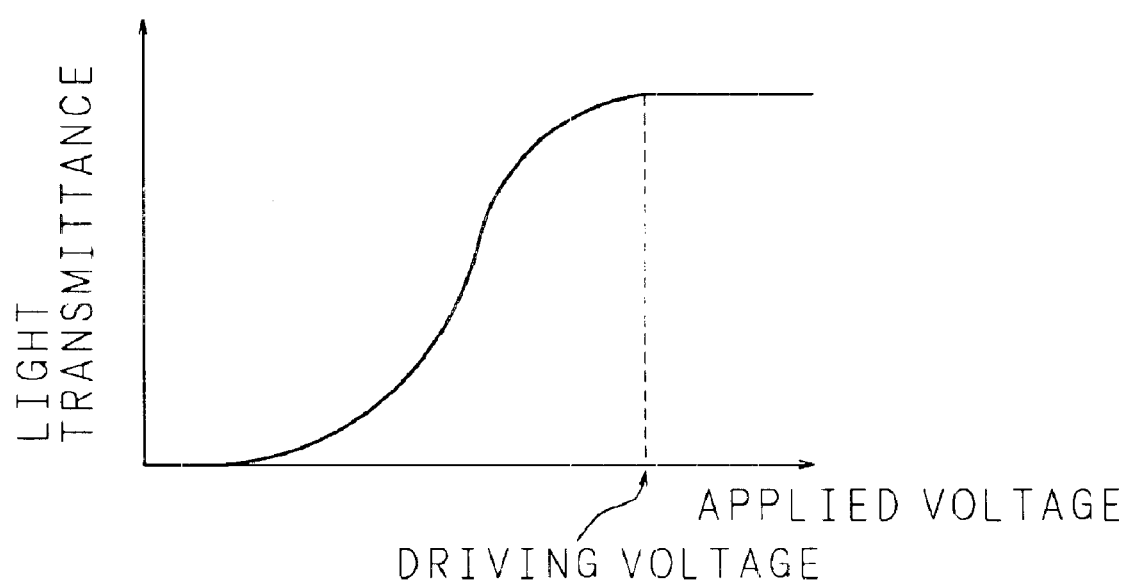
FIG. 2 is an explanatory drawing that shows the definition of a driving voltage.
Figure 3A:
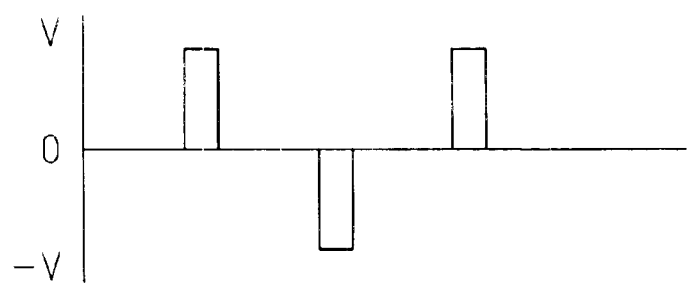
FIGS. 3A and 3B are explanatory drawings that show the definition of a holding rate.
Figure 3B:
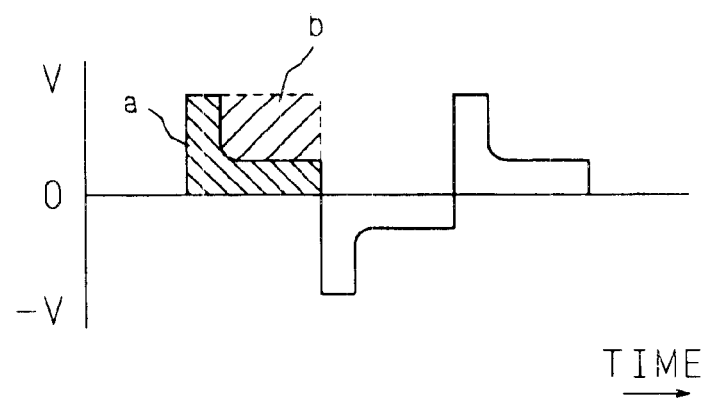
Figure 4:
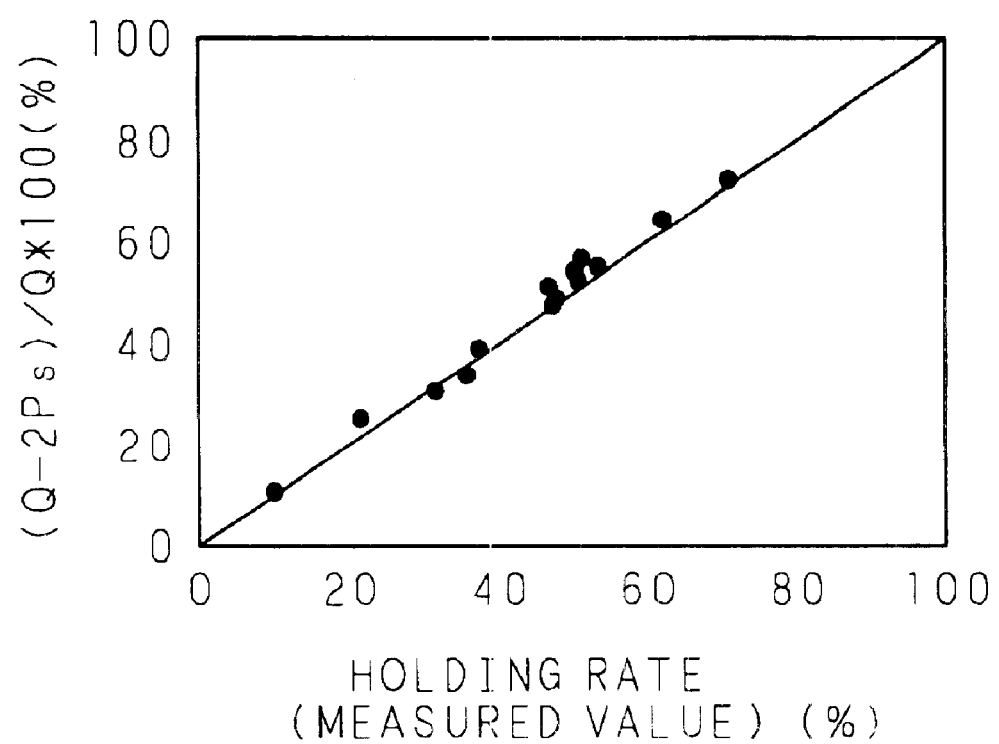
FIG. 4 is a graph that shows the relationship between the holding rate and the calculated value.

Then, a voltage was applied to the liquid crystal through the switching element of the TFT 11 so that the applied voltage and the light transmittance were measured. Consequently, the light transmittance varied in proportion to the applied voltage and came to be saturated at approximately 15 V. The results of the measurements are given in the graph showing the relationship between the applied voltage and the light transmittance in the conventional liquid crystal display shown in FIG. 1. In this manner, the liquid crystal display of Comparative Example fails to drive the liquid crystal even upon application of a driver IC of an output voltage of ±10 V.

Here, in the case when a voltage of 15 V was applied during the ON-state of the switching element, the quantity of charge injected to each pixel was 46 nC/cm².

Additionally, in the above-mentioned Examples, a ferroelectric liquid crystal was used; however, any liquid crystal may be used as long as it has a spontaneous polarization; and liquid crystals such as an anti-ferroelectric liquid crystal and a DHF (deformed helical ferroelectric liquid crystal), may be used with the same effects.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| No. | SPONTANEOUS POLARIZATION (Ps) nC/cm² | RELATIVE DIELECTRIC CONSTANT |
| --- | --- | --- |
| 1 | 12.82 | 6.17 |
| 2 | 14.25 | 6.64 |
| 3 | 7.99 | 5.67 |
| 4 | 2.52 | 3.18 |
| 5 | 3.85 | 5.59 |
| 6 | 27.53 | 5.89 |
| 7 | 7.43 | 3.01 |
| 8 | 7.84 | 6.08 |
| 9 | 4.13 | 5.86 |
| 10 | 7.00 | 5.54 |
| 11 | 5.30 | 4.17 |
| 12 | 5.40 | 6.29 |
| 13 | 6.64 | 6.93 |
| 14 | 7.27 | 8.21 |

What is claimed is:

1. A liquid crystal display, comprising:

liquid crystal display elements having a pair of substrates with a liquid crystal therebetween having a spontaneous polarization;

an electrode corresponding to a pixel and a switching element that are placed on an inner surface of one of the substrates, the switching element being allowed to drive the liquid crystal corresponding to a pixel when turned on; and a liquid crystal driving unit capable of outputting driving voltages less than or equal to a predetermined maximum driving voltage, wherein the spontaneous polarization of the liquid crystal is a magnitude of not more than ½ of a quantity of charge that is injected into a liquid crystal element corresponding to a pixel when the maximum driving voltage is applied to the liquid crystal element when the switching element is turned on, which is a relatively short period in which the spontaneous polarization barely responds, and wherein the liquid crystal has a relative dielectric constant of not less than 3, said relative dielectric constant being not affected by the spontaneous polarization.

2. The liquid crystal display according to claim 1, further comprising:

a back-light for emitting white light; and color filters of three primary colors placed between the substrates, wherein the emitted light is selectively transmitted through the color filters of the three primary colors so as to carry out a color display.

3. The liquid crystal display according to claim 1, further comprising:

a back-light having light sources for respectively emitting light rays of three primary colors, wherein the light sources are allowed to emit light rays in a time divided manner in synchronism with ON/OFF driving processes of the switching element so as to carry out a color display.

4. The liquid crystal display according to claim 1, wherein the spontaneous polarization of the liquid crystal is a magnitude of not more than 15 nC/cm².

5. The liquid crystal display according to claim 4, further comprising:

a back-light for emitting white light; and color filters of three primary colors placed between the substrates, wherein the emitted light is selectively transmitted through the color filters of the three primary colors so as to carry out a color display.

6. The liquid crystal display according to claim 4, further comprising:

a back-light having light sources for respectively emitting light rays of three primary colors, wherein the light sources are allowed to emit light rays in a time divided manner in synchronism with ON/OFF driving processes of the switching element so as to carry out a color display.

7. The liquid crystal display according to claim 1, wherein the spontaneous polarization of the liquid crystal is a magnitude of not more than 10 $nC/cm^2$.

8. The liquid crystal display according to claim 7, further comprising:

a back-light for emitting white light; and color filters of three primary colors placed between the substrates, wherein the emitted light is selectively transmitted through the color filters of the three primary colors so as to carry out a color display.

9. The liquid crystal display according to claim 7, further comprising:

a back-light having light sources for respectively emitting light rays of three primary colors, wherein the light sources are allowed to emit light rays in a time divided manner in synchronism with ON/OFF driving processes of the switching element so as to carry out a color display.

10. The liquid crystal display according to claim 1, wherein the spontaneous polarization of the liquid crystal is a magnitude of not more than 7 $nC/cm^2$.

11. The liquid crystal display according to claim 10, further comprising:

a back-light for emitting white light; and color filters of three primary colors placed between the substrates, wherein the emitted light is selectively transmitted through the color filters of the three primary colors so as to carry out a color display.

12. The liquid crystal display according to claim 10, further comprising:

a back-light having light sources for respectively emitting light rays of three primary colors, wherein the light sources are allowed to emit light rays in a time divided manner in synchronism with ON/OFF driving processes of the switching element so as to carry out a color display.

13. The liquid crystal display according to claim 1, wherein the period in which the switching element is turned on and the spontaneous polarization barely responds is less than 5 microseconds.

* * * * *